July 24, 1923.
P. C. GALLAWAY
YOKE FOR CATTLE
Filed Aug. 10, 1922
1,462,743
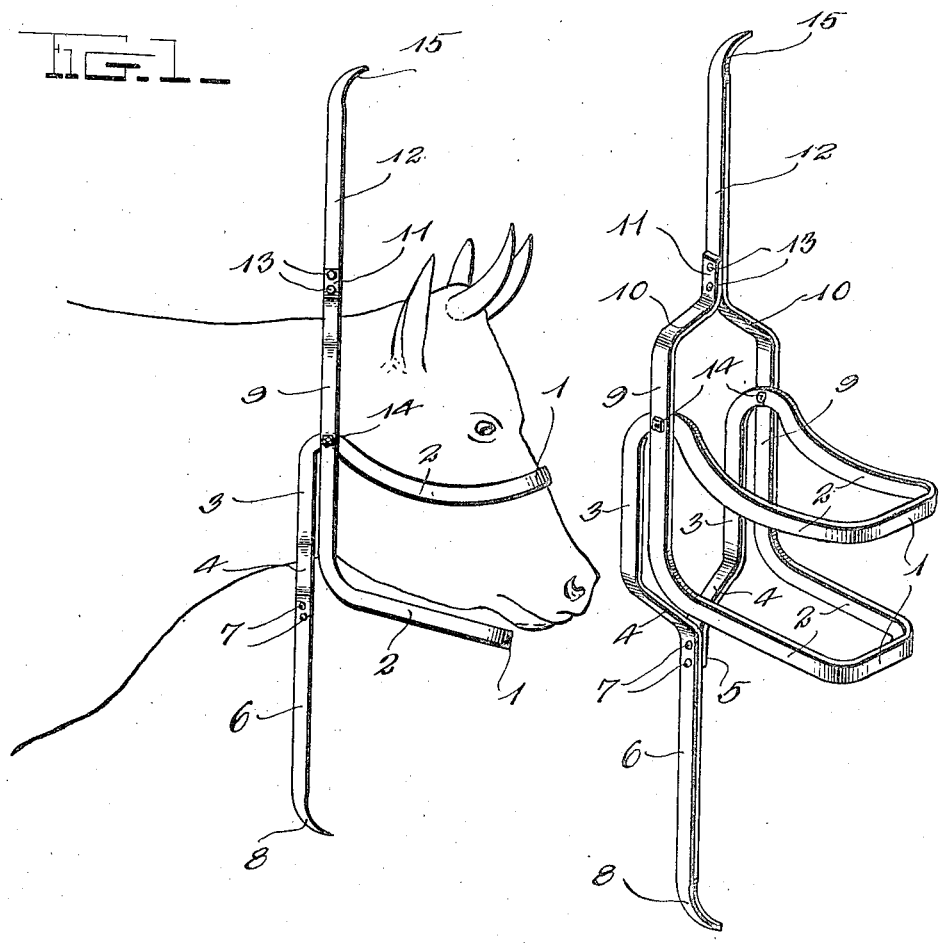
Witness
H. Woodard
Inventor
P. C. GALLAWAY
By H. A. Wilson & Co.
Attorneys Patented July 24, 1923.

1,462,743

UNITED STATES PATENT OFFICE.

PERRY C. GALLAWAY, OF DE QUEEN, ARKANSAS.

YOKE FOR CATTLE.

Application filed August 10, 1922. Serial No. 580,942.

*To all whom it may concern:*

Be it known that I, PERRY C. GALLAWAY, a citizen of the United States, residing at De Queen, in the county of Sevier and State of Arkansas, have invented certain new and useful Improvements in Yokes for Cattle; and I do declare the following to be a full, clear, and exact description of the invention, such as will enable others skilled in the art to which it appertains, to make and use the same.

This invention relates to an improved yoke for use upon cattle and one object of the invention is to provide a yoke which will be put in place about the head and neck of the animal and will serve to prevent the animal from pushing its way through a fence or other obstruction.

Another object of the invention is to so construct the yoke that when the animal attempts to push its way through an obstruction such as a fence, lever arms will engage the fence and swing pivotally connected portions of the yoke to bring the jaw forming elements thereof towards each other into biting engagement with the under jaw and nose portion of the animal and thus cause pinching which will inflict a certain amount of pain and cause the animal to discontinue its attempt to push its way through or past the obstruction.

Another object of the invention is to so construct this yoke that it may be readily put in place and to further so construct it that when in place, it will be retained in the proper position by its fit about the head and neck of the animal.

Another object of the invention is to so construct this yoke that each of the pivoted sections may be in the form of an open frame and handle extension, the open frame and handle extension being formed from a single strip of metal bent to assume the desired shape.

This invention is illustrated in the accompanying drawing, wherein:

Figure 1 is a view in side elevation showing the yoke applied to a cow.

Figure 2 is a perspective view of the improved yoke unapplied.

This improved restraining yoke is formed in two sections which are substantially duplicate in their construction. These sections are pivotally connected so that they provide a collar for fitting about the neck of the animal and upper and lower jaws which will be moved towards each other into biting engagement with the lower jaw and nose portion of the animal's head when the handle extensions of the two frames are moved rearwardly through engagement with a fence or other obstruction. Each of these frames has been formed from a single strip of sheet metal bent intermediate its length to provide a cross bar 1 which forms the biting element of the jaw, and side bars 2 which extend in spaced relation. The side bars 2 of the upper jaw are bent to provide depending portions 3 which extend downwardly upon opposite sides of the animal's neck and are then brought towards each other as shown at 4. After being brought towards each other, the end portions 5 and 6 are bent to extend parallel to each other and are secured by rivets or other suitable fasteners 7. It should be noted that the end portion 6 is elongated and extends beyond the end portion 5 thus providing a handle which has its free end portion tapered and bent to provide a hook 8 for engaging the wires or rails from which the fence is formed and preventing the lever handle 6 from having any tendency to slip past the wires or rails and pass through the fence. The arms 2 of the lower jaw are bent to provide upwardly extending portions 9 which correspond to the depending portions 3 of the upper jaw. These arms 9 extend upon opposite sides of the animal's neck and are brought towards each other as shown at 10. After being brought towards each other, the end portions 11 and 12 are extended parallel and secured by rivets 13. It will thus be seen that when the arms 2 of the upper jaw are passed between the upwardly extended portions 9 of the arms of the lower jaw and secured by pivot-forming fasteners 14, there will be provided a collar which will fit about the neck of the animal as shown in Fig. 1 and upper and lower jaws for extending about and beneath the head of the animal. It should be noted that the arms 2 of the upper jaw are curved longitudinally so that the upper jaw will fit comfortably about the head of the animal. The end portion 12 is extended similar to the end portion 6 thus providing an upper lever handle which terminates in a hook 15 which corresponds to the hook 8 and is intended to engage the wires or rails from which the fence is formed.

When this yoke is in use, the animal's head will be passed through the collar-forming portion so that this portion will be positioned about the neck of the animal and the upper and lower jaws will extend about and beneath the head of the animal. The shape of the yoke causes it to remain in the vertical position shown. If the cow should attempt to force its way through a fence by passing its head between the rails or wires and then pushing against the fence to push the fence over or break the wires, the levers 6 and 12 will engage with the wires or rails above and below the opening through which the cow has passed its head. This engagement of the levers with the wires or rails will cause the levers to be forced rearwardly when the cow attempts to push its way through the fence and as the levers move rearwardly, the upper jaw will be swung downwardly and the lower jaw swung upwardly. Therefore, the upper jaw will have a tendency to bite into the nose portion of the animal and the lower jaw will have a tendency to bite into the lower jaw of the animal. The pinching of the two jaws will therefore cause a certain amount of pain which will not permanently injure the animal but at the same time will cause the animal to cease pushing forwardly and eventually withdraw its head from between the wires or rails of the fence. While it has been stated that this device is to prevent the cow from forcing its way through a fence, it will be understood that it will serve effectively to prevent the cow from forcing its way through any obstruction with which the lever handles can have contact. It will further serve to prevent a cow from jumping a fence as when the cow attempts to jump the fence, the lower lever will strike the fence and prevent the cow from successfully jumping the fence. When the animal has retreated from the fence or other obstruction after having its nose and lower jaw pinched while attempting to force its way through, the pressure upon the levers will be released and the pivoted sections of the yoke will return to the normal position thus relieving the pressure and preventing pain. When so desired, the yoke can be readily removed by the person having charge of the animal but it cannot of itself slip out of place.

What is claimed is:

1. A restraining yoke comprising pivoted elements, one having a gripping portion for extending above the nose and the second having a gripping portion for extending beneath the lower jaw of an animal, and means for moving said gripping portions towards each other into position for biting engagement with the nose and lower jaw of the animal.

2. A restraining yoke comprising pivoted elements, one having a gripping portion for extending above the nose and the second having a gripping portion for extending beneath the lower jaw of an animal, and means actuated through engagement with an obstruction for moving the gripping portions into biting engagement with the nose and lower jaw of the animal when the animal attempts to pass the obstruction.

3. A restraining yoke comprising pivoted elements, one having a gripping portion for extending above the nose and the second having a gripping portion for extending beneath the lower jaw of an animal, said gripping elements having upwardly and downwardly extending handle elements for engaging an obstruction and moving the gripping portions into gripping engagement with the head of the animal.

4. A restraining yoke comprising an open frame for fitting about the neck of an animal, said frame having its lower portion disposed horizontally for extending beneath the lower jaw of the animal, a second open frame pivotally connected with the first frame and having a portion for extending about the throat of the animal and a horizontally disposed portion for extending along the cheeks and across the nose of the animal, and handle elements extending from the upper end of the first frame and lower end of the second frame for moving the frames to bring the horizontally disposed portions towards each other when the handles are moved rearwardly of the animal.

5. The structure of claim 4 having each frame and handle formed from a single strip of material bent to form the frame with one end portion extended to form the handle.

In testimony whereof I have hereunto affixed my signature.

PERRY C. GALLAWAY.